(12) United States Patent
Ishida

(10) Patent No.: US 6,835,237 B2
(45) Date of Patent: Dec. 28, 2004

(54) AIR CLEANER

(75) Inventor: Kosaku Ishida, Kanagawa-ken (JP)

(73) Assignee: Tokyo Roki Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/060,635

(22) Filed: Jan. 30, 2002

(65) Prior Publication Data

US 2003/0066427 A1 Apr. 10, 2003

(30) Foreign Application Priority Data

Oct. 5, 2001 (JP) ........................................ 2001-310435

(51) Int. Cl.[7] .............................................. B01D 53/02
(52) U.S. Cl. ......................... 96/135; 55/385.3; 123/518
(58) Field of Search ........................ 96/134, 135, 147; 55/385.3, 518, DIG. 28; 123/518, 519, 520, 198 E

(56) References Cited

U.S. PATENT DOCUMENTS

| | | | | |
|---|---|---|---|---|
| 3,646,731 A | * | 3/1972 | Hansen ......................... | 96/136 |
| 3,678,663 A | * | 7/1972 | Hansen ......................... | 96/141 |
| 3,849,093 A | * | 11/1974 | Konishi et al. ............... | 96/138 |
| 4,418,662 A | * | 12/1983 | Engler et al. .................. | 96/133 |
| 4,683,862 A | * | 8/1987 | Fornuto et al. .............. | 123/520 |
| 4,714,486 A | * | 12/1987 | Silverthorn ................... | 96/134 |
| 5,111,900 A | * | 5/1992 | Leitermann ................. | 180/69.4 |
| 5,912,368 A | * | 6/1999 | Satarino et al. ............... | 55/320 |
| 6,440,200 B1 | * | 8/2002 | Sakakibara et al. ............ | 96/134 |
| 6,464,761 B1 | * | 10/2002 | Bugli ........................... | 96/135 |
| 6,505,610 B2 | * | 1/2003 | Everingham et al. ........ | 123/516 |

FOREIGN PATENT DOCUMENTS

JP      56-32072 A   *  4/1981

* cited by examiner

Primary Examiner—Frank M. Lawrence
(74) Attorney, Agent, or Firm—Harness, Dickey & Pierce, P.L.C.

(57) ABSTRACT

There is provided an air cleaner in which air does not take along evaporated fuel adsorbed by an adsorbent of a canister. In an air cleaner (15), within a casing (20) comprised of a primary side case (17) having an inlet (16) at one side and a secondary side case (19) having an outlet (18) at the other side and in between the cases (17) and (19), there is provided a filter element (22) in a vertical state with a filter medium (21) folded in a zigzag that prevents dust flowing into an engine. The inlet (16) and the outlet (18) are both arranged above a center line of the casing (20). Within the secondary side case (19) of the casing (20), at only the secondary side bottom of the filter element (22), there is provided a canister (23) comprising an adsorbent such as a granular activated carbon, a honeycomb activated carbon, an activated carbon fiber, or an activated carbon mixed paper, which adsorbs evaporated fuel, across approximately an entire width of the casing (20) in a width direction, and in only an upper flow side half of an air flow direction.

6 Claims, 6 Drawing Sheets

AIR CLEANER

BACKGROUND OF THE INVENTION

The present application claims priority upon Japanese Patent Application No. 2001-310435 filed on Oct. 5, 2001 which is herein incorporated by reference.

1. Field of the Invention

The present invention relates to an air cleaner comprising an evaporated fuel process device (hereinafter, referred to as "canister") for adsorption process of evaporated fuel which remains near an injector or a carburetor of a vehicle and includes a large amount of hydrocarbon (HC) to be one of the cause of air pollution, and for prevention of evaporated fuel from being released in the atmosphere.

2. Description of the Related Art

Conventionally, this type of air cleaner 1, for example as shown in FIG. 9, comprises a filter element 7 within a filter body 6 comprising a cover 5 and a body 4 having an inlet pipe 2 and an outlet pipe 3, and comprises a cylindrical canister 11 which takes the vertical axis as its center and stores at a discharge side (inner side) of the filter element 7 an adsorbent 10 in between lattice holding members 8, 9 which are arranged concentrically with a predetermined space.

In the air cleaner 1, by air passing through the filter element 7 and the canister 11 in a radial direction, evaporated fuel which remains near the injector or the carburetor is adsorbed by the adsorbent 10 of the canister 11, and evaporated fuel adsorbed by the adsorbent 10 is desorbed by a negative pressure of a suction pipe and processed to be sucked from the outlet pipe 3 to an engine. Thus, evaporated fuel is stopped from being released in the atmosphere and air pollution is prevented.

However, in actuality there was a technical problem as described below.

Namely, with the air cleaner 1 comprising the above described conventional canister 11, since the canister 11 sandwiches the holding member 9 and adheres to the filter element 7, there was fear that evaporated fuel adsorbed by the adsorbent of the canister 11 is taken along and released in the atmosphere from the outlet pipe 3, at the time air from the inlet pipe 2 which has passed the filter element 7 passes the canister 11.

Further, with the conventional air cleaner 1, the adsorbent of the canister 11 is cylindrically arranged taking the vertical axis as the center, so that if a vibration of a vehicle when running is passed on to the air cleaner 1, there is fear that the adsorbent within the canister 11 will move to a lower portion side. As a result, there is formed a space in an upper portion where there is no adsorbent. Further, since the canister 11 sandwiches the holding member 9 and adheres to an entire inner surface of the filter element 7, there is a problem that a resistance of air in the upper portion is small, whereas a resistance of air in the lower portion is large, and blocking at an early stage is brought about in the upper portion of the filter element 7 and life is shortened.

Meanwhile, the present inventors found that evaporated fuel is heavier than the atmosphere, and flows along the bottom in the filter body 6.

SUMMARY OF THE INVENTION

This invention is made to solve the above problems, and based on the above finding, an object thereof is to provide an air cleaner comprising a canister where air does not take along evaporated fuel adsorbed by an adsorbent of the canister, and which may lengthen life of a filter element.

In order to achieve the above objects, one aspect of the present invention is an air cleaner comprising a filter element, and a casing having an inlet provided at a primary side of the filter element and an outlet provided at a secondary side, characterized in that an adsorbent adsorbing evaporated fuel is arranged at a bottom of the casing at the secondary side of the filter element.

Further, another aspect of the present invention is an air cleaner comprising a filter element, and a casing having an inlet provided at a primary side of the filter element and an outlet provided at a secondary side, characterized in that an absorbent material adsorbing evaporated fuel is arranged at a bottom of the outlet.

In this invention, it is preferable that the filter element is vertically arranged, and the outlet projects horizontally from a side portion of the casing.

Further, another aspect of the present invention is characterized by comprising a casing storing an adsorbent, for adsorbing evaporated fuel, with a predetermined height horizontally in between a secondary side of a filter element and an outlet.

In this invention, it is preferable that the adsorbent is held by lattice upper and lower holding members. Further, it is preferable that the filter element is horizontally arranged, the outlet vertically projects from a bottom of the casing, there is provided a vertical connecting portion connected to the outlet, and the adsorbent is arranged over the entire horizontal cross section of the connecting portion.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF PREFERRED EMBODIMENTS

Figure 1:
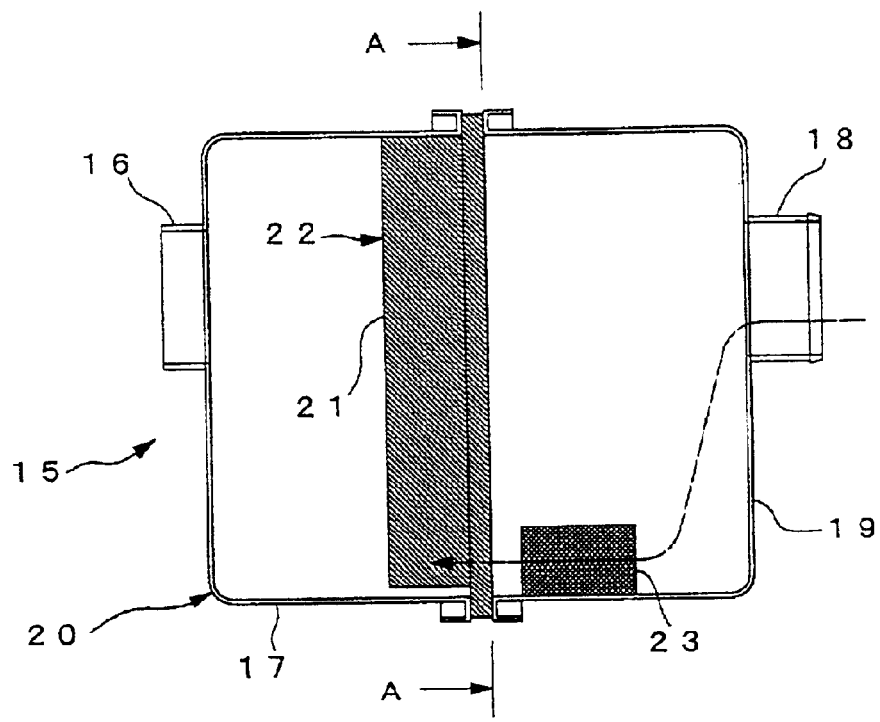
FIG. 1 is a sectional view of an air cleaner according to Embodiment 1 of the present invention.

Hereinbelow, Embodiment 1 of the present invention is described referring to FIGS. 1 and 2. In an air cleaner 15 according to this embodiment, within a casing 20 comprised of a primary side case 17 having an inlet 16 at one side and a secondary side case 19 having an outlet 18 at the other side and in between the cases 17 and 19, there is provided a filter element 22 in a vertical state which is a filter medium 21 folded in a zigzag that prevents dust flowing into an engine. The inlet 16 and the outlet 18 are both arranged above a center line of the casing 20.

Then, within the secondary side case 19 of the casing 20, at only the secondary side bottom of the filter element 22, there is provided a canister 23, comprising an adsorbent for adsorbtion of evaporated fuel such as a granular activated carbon, a honeycomb activated carbon, an activated carbon fiber, or an activated carbon mixed paper, across approximately the entire width of the casing 20 in the width direction, and in only the upper flow side half of the air flowing direction. The canister 23 is preferably fixed to the bottom by a predetermined holding member.

Figure 3:
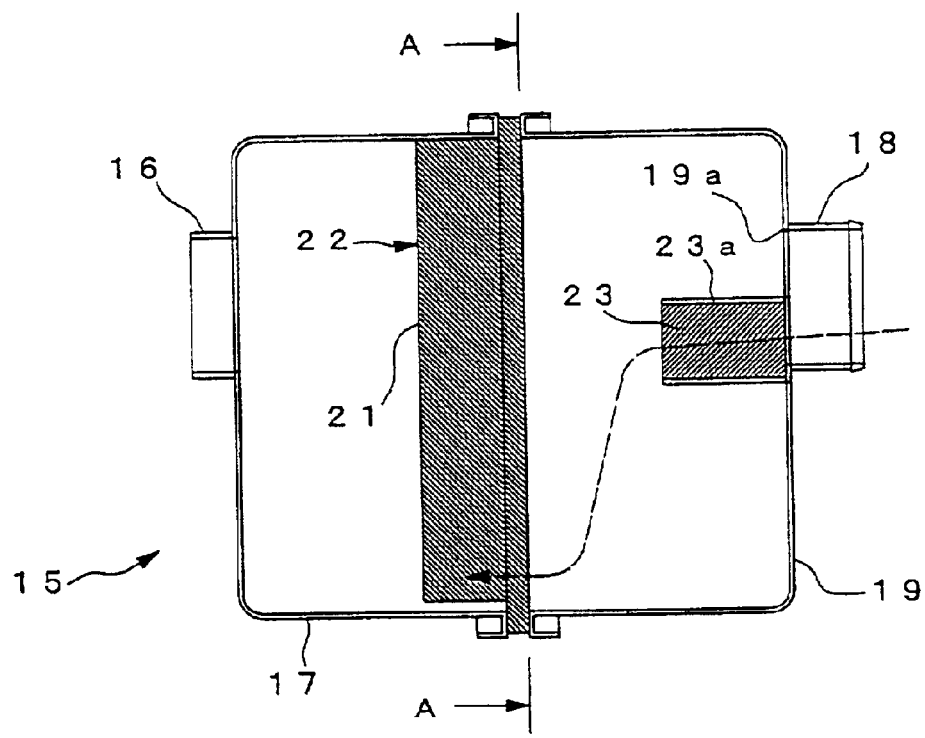
FIG. 3 is a sectional view of an air cleaner according to a modified example of Embodiment 1.
Figure 4:
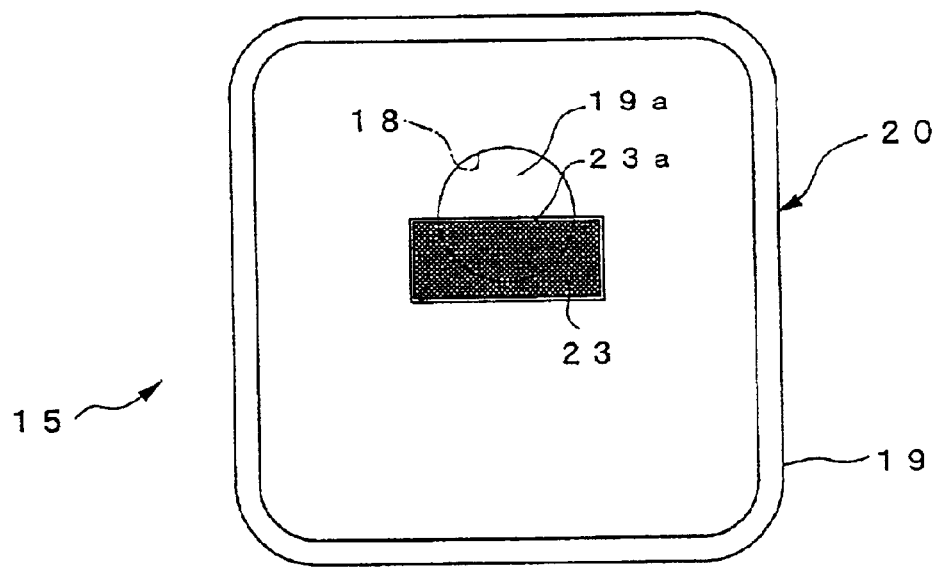
FIG. 4 is a sectional view along an A—A line of the air cleaner.

FIGS. 3 and 4 show a modified example the canister 23 of Embodiment 1 provided at the bottom of the outlet 18. In this embodiment, the adsorbent, formed in the secondary side case 19 inside the casing 20 to cover the lower half portion of an opening 19a facing the outlet 18, is fixedly arranged by a predetermined holding member 23a to construct the canister 23.

In the above Embodiments 1 and 2, in the air cleaner 15, the sucked air including dust from the inlet 16 passes the primary side case 17, is filtered by the filter element 22 and purified, and passes through the canister 23 and is sent to an engine from the outlet 18. At this time, if the engine stops, the fuel remaining near an injector or a carburetor (not shown) evaporates and enters from the outlet 18, evaporated fuel flows along the bottom in the casing 20 as shown by a dotted line in the figure, and is adsorbed by the adsorbent within the canister 23. Then, due to the engine starting again, evaporated fuel adsorbed by the canister 23 is desorbed by a negative pressure of a suction pipe and processed to be sucked by the engine from the outlet 18, to prevent air pollution.

According to the present embodiment, different to the conventional example where the canister sandwiches the holding member and adheres to the filter element, when air from the inlet 16 passes the filter element 22, a large portion of air does not pass the canister 23, and evaporated fuel adsorbed by the adsorbent is not taken along. Further, since the canister 23 does not adhere to the filter element 22, life of the filter element is not influenced.

Figure 2:
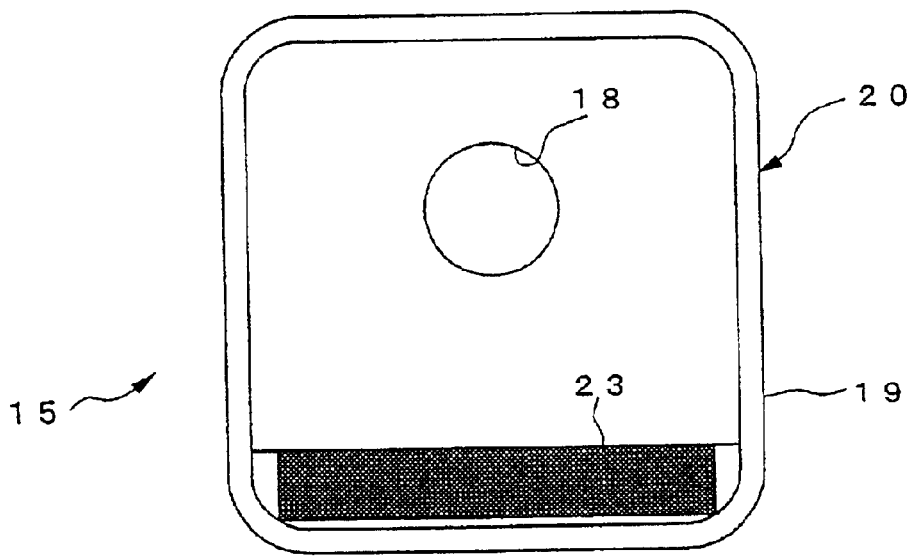
FIG. 2 is a sectional view along an A—A line of the air cleaner.

Note that, the canister 23 may be provided at the entire bottom surface of the secondary side as in Embodiment 1, or may be a combination of the embodiment in FIG. 1 and the embodiment in FIG. 3.

Figure 5:
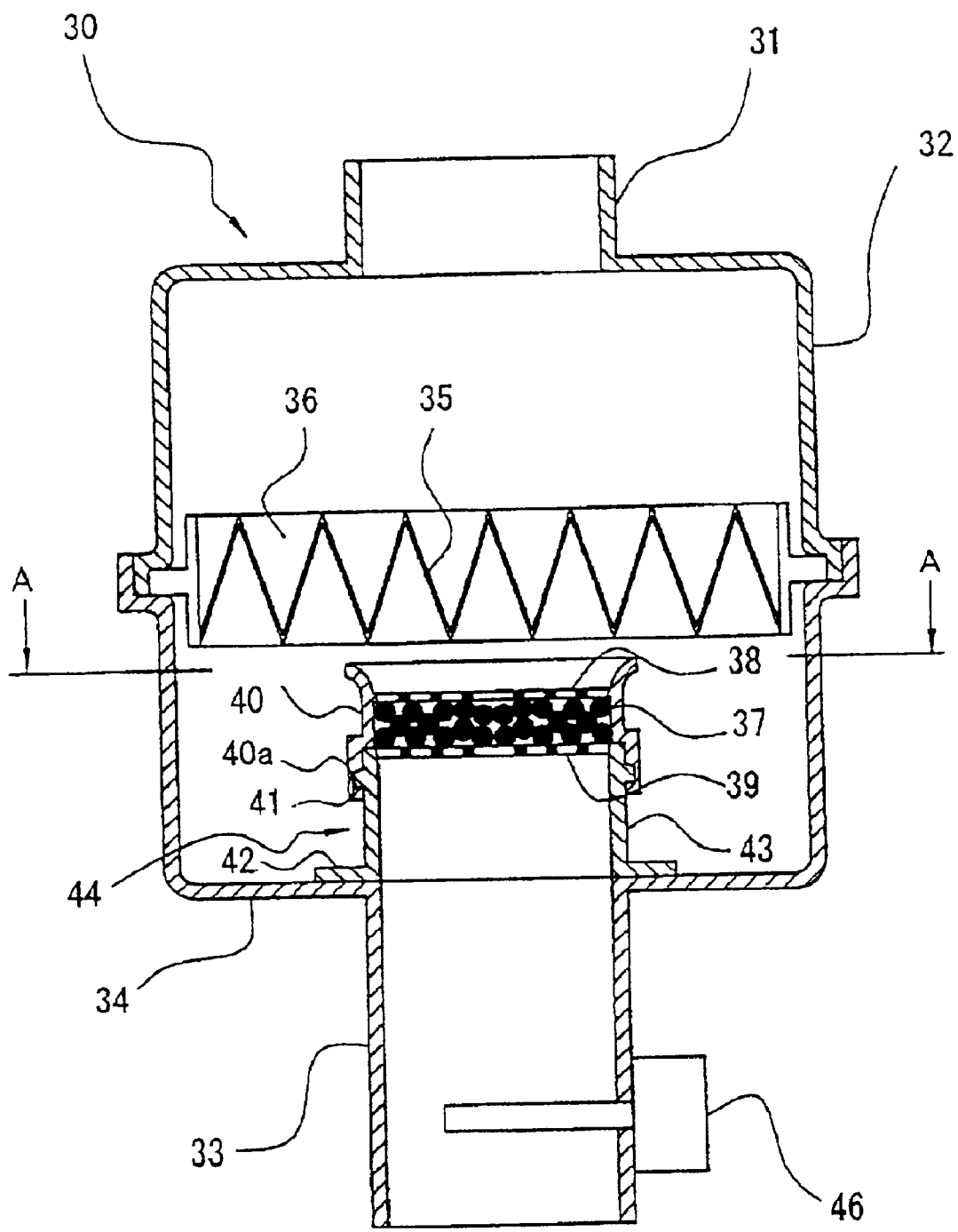
FIG. 5 is a sectional view of an air cleaner according to Embodiment 2 of the present invention.
Figure 6:
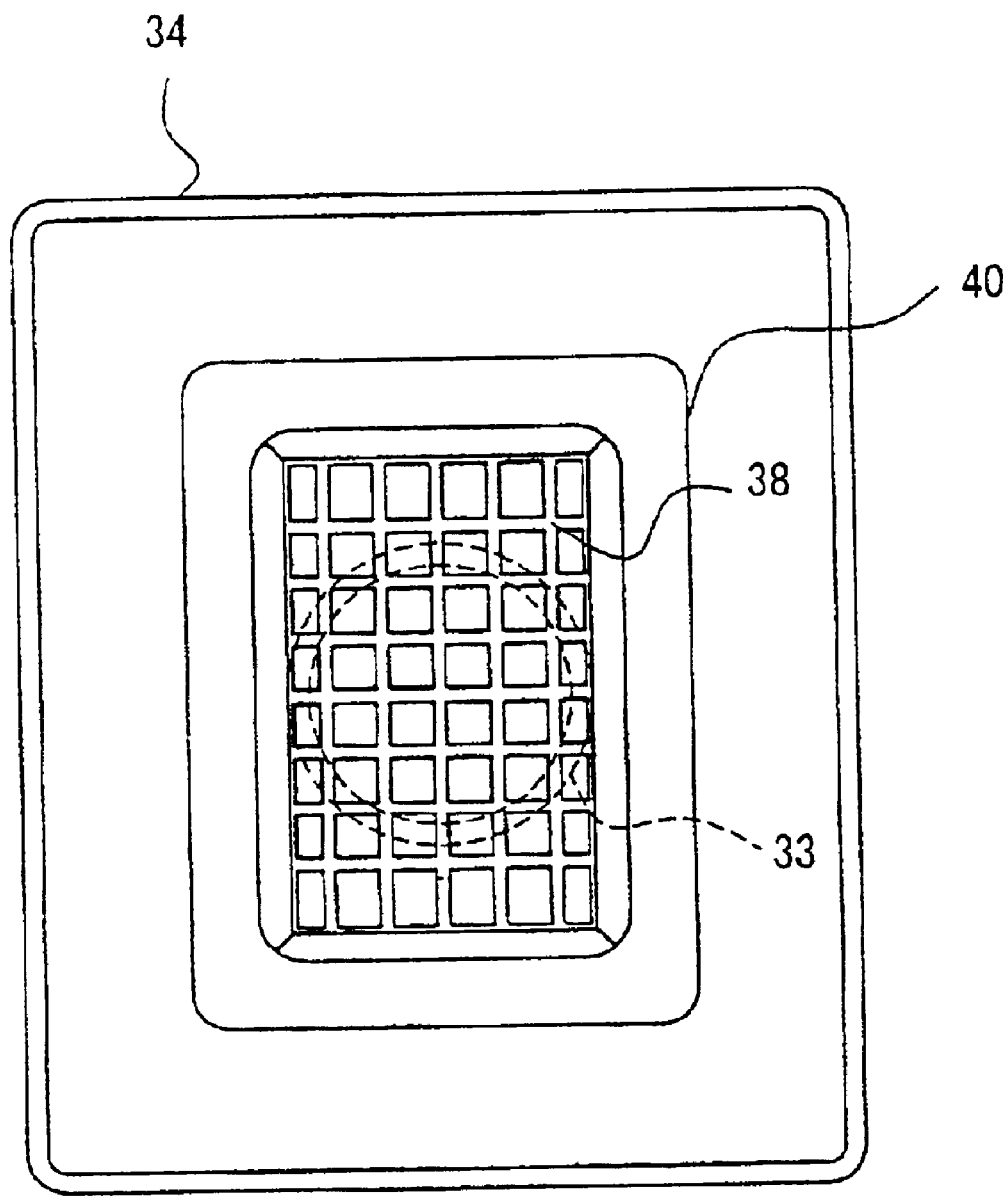
FIG. 6 is a sectional view along an A—A line of the air cleaner.

Next, Embodiment 2 is described referring to FIGS. 5 and 6. An air cleaner 30 according to this embodiment is comprised by being provided with a filter element 36, with a filter medium 35 folded in a zigzag which prevents dust from flowing in to the engine, in between an upper case 32 having an inlet 31 at the top and a lower case 34 having an outlet 33 at the bottom.

In between a secondary side of the filter element 36, namely a discharge side (lower part), and an outlet 33, there are provided lattice upper and lower holding members 38 and 39 storing horizontally at a predetermined height an adsorbent 37 such as a granular activated carbon, a honeycomb activated carbon, an activated carbon fiber, or an activated carbon mixed paper, which adsorbs evaporated fuel. The discharge side of the filter element 36 and the upper holding members 38 do not adhere, but are spaced with a predetermined distance.

Further, the upper holding member 38 is held in a hollow square tube shaped casing 40 having a concave portion 40a at an inner side thereof, and the lower holding member 39 is held at the upper portion of a hollow square tube shaped connecting portion 43 which has a convex portion 41 engaging with the concave portion 40a of the casing 40 at the outer periphery portion and which is fixed to the bottom of the lower case 34 by a support flange 42.

The adsorbent 37, the upper and lower holding members 38 and 39, the casing 40, the connecting portion 43 and the like construct a canister 44.

Figure 7:
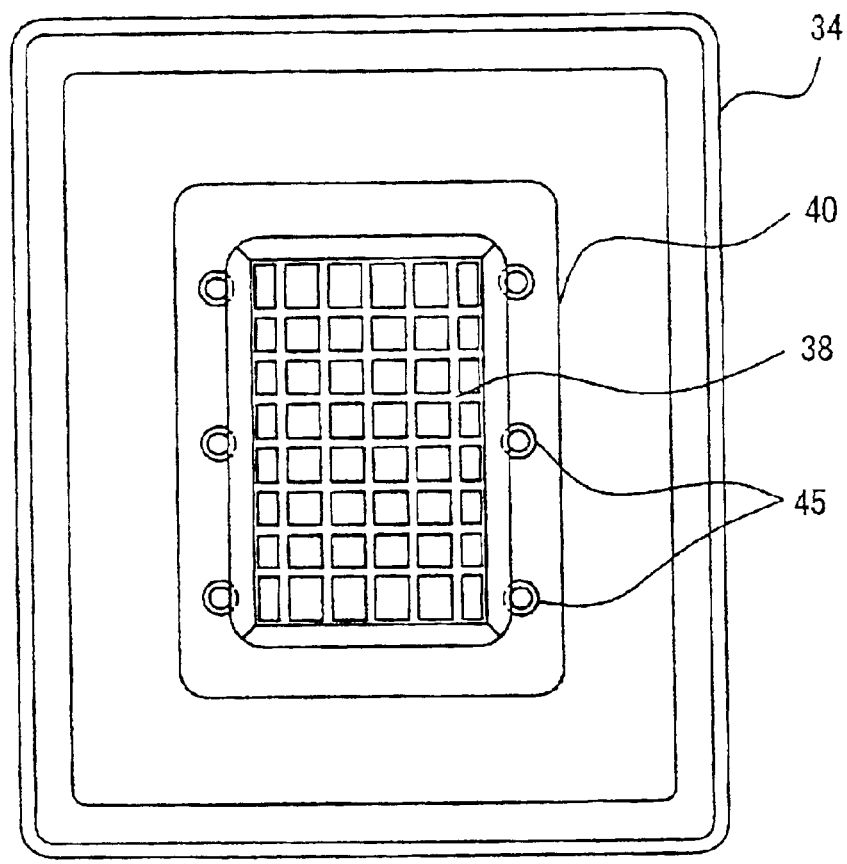
FIG. 7 is a plan view showing a canister mounting portion of the air cleaner.
Figure 8:
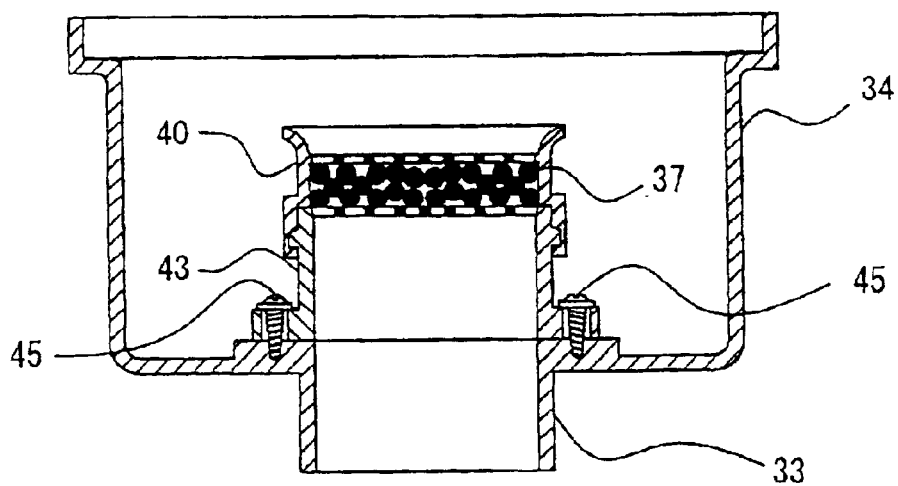
FIG. 8 is a sectional view showing the canister mounting portion of the air cleaner.
Figure 9:
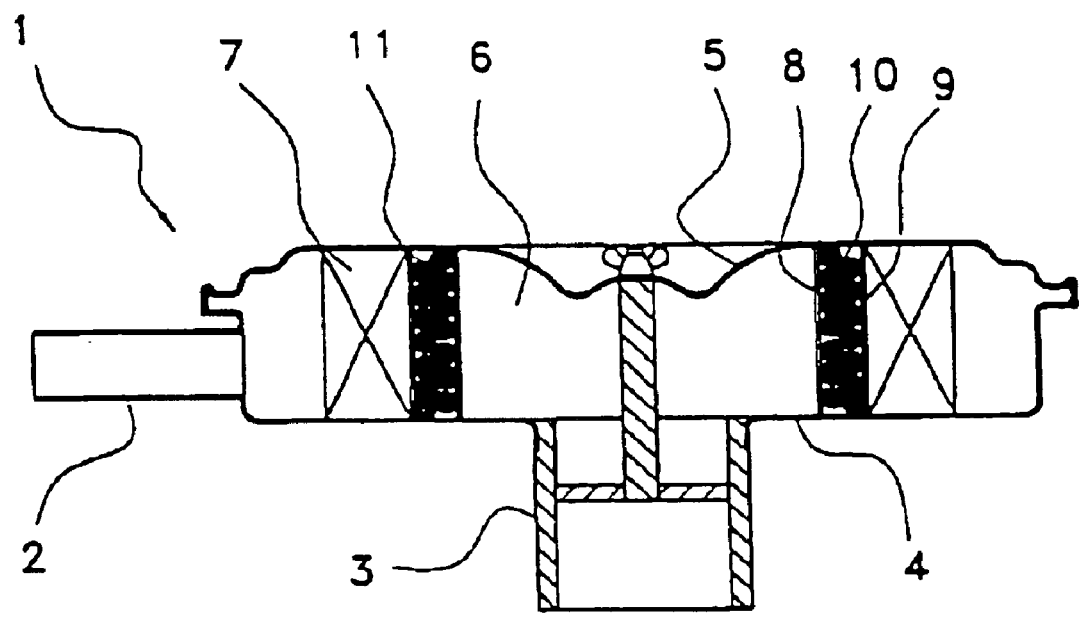
FIG. 9 is a sectional view showing a conventional air cleaner.

FIG. 7 shows the canister 44 as rectangular, but it may be of other shapes such as circular. Further, as shown in FIGS. 7 and 8, the canister 44 may be mounted to the lower case 34 by screws 45.

In the above embodiments, evaporated fuel is adsorbed by the adsorbent 37 horizontally arranged with a predetermined height within the canister 44. In this way, because the adsorbent 37 is horizontally arranged, even if the vibration of the vehicle when running is delivered to the canister 44, a space where evaporation fuel passes without being adsorbed is not easily created at any position in the horizontal direction in between the upper and lower holding members 38 and 39. Thus, even if the canister 44 does not adhere to the filter element 36, evaporated fuel may be completely adsorbed to prevent air pollution.

Note that, at the lower portion of the air cleaner 15, a flow sensor 46 is mounted, and a length of the connecting portion 43 of the canister 44 is set to be suitable for preventing a malfunction of a flow sensor 46 from occurring due to a disturbance of air.

According to the above structures, there may be provided an air cleaner comprising a canister in which air does not take along evaporated fuel adsorbed by the adsorbent, and further which may lengthen life of the filter element.

Although the preferred embodiment of the present invention has been described in detail, it should be understood that various changes, substitutions and alternations can be made therein without departing from spirit and scope of the inventions as defined by the appended claims.

What is claimed is:

1. An air cleaner comprising:
   a filter element; and
   a casing containing said filter element and having
      an inlet that is provided at a primary side of said filter element and that is for taking in air, and
      an outlet that is provided at a secondary side of said filter element and that is for sending out the air to an engine, wherein
   an adsorbent adsorbing evaporated fuel is arranged only at a bottom inside said casing at the secondary side of said filter element.

2. An air cleaner comprising:
   a filter element; and
   a casing containing said filter element and having
      an inlet that is provided at a primary side of said filter element and that is for taking in air, and
      an outlet that is provided at a secondary side of said filter element and that is for sending out the air to an engine, wherein
      an adsorbent evaporated fuel is arranged only at a bottom of said outlet on the inner side thereof.

3. An air cleaner according to claim 1, wherein said filter element is vertically arranged, and said outlet projects horizontally from a side portion of said casing.

4. An air cleaner comprising:
   a filter element;
   a secondary-side case having an outlet that is provided at a secondary side of said filter element and that is for sending out air to an engine;
   a casing arranged inside said secondary-side case; and
   an adsorbent for adsorbing evaporated fuel, said adsorbent being provided in said casing, having a predetermined thickness, and being arranged in the cross-sectional direction of said secondary-side case.

5. An air cleaner according to claim 4, wherein said adsorbent is held by lattice upper and lower holding members.

6. An air cleaner according to claim 4, wherein
   said filter element is horizontally arranged, said outlet vertically projects from a bottom of said casing, there is provided a vertical connecting portion coupled to said outlet, and said adsorbent is arranged over the entire horizontal cross section of said connecting portion.

* * * * *